Dec. 24, 1929.                S. L. LEBBY                1,740,609
                             LIGHT PROJECTOR
                            Filed June 11, 1925
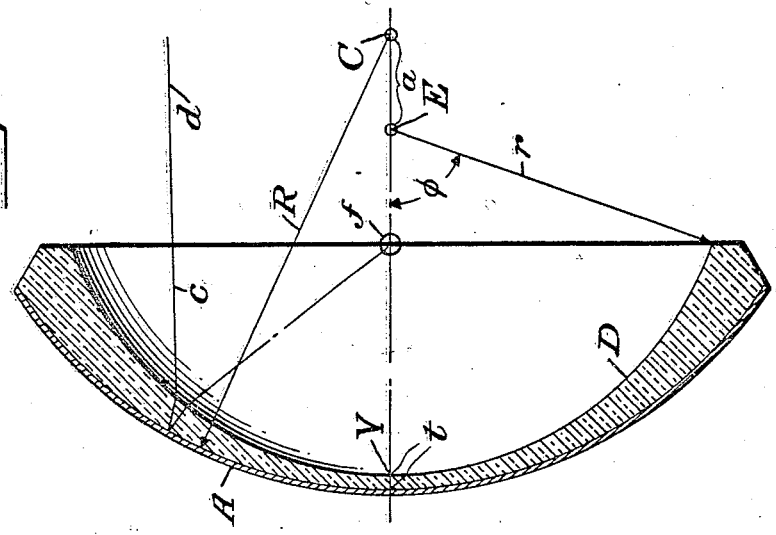
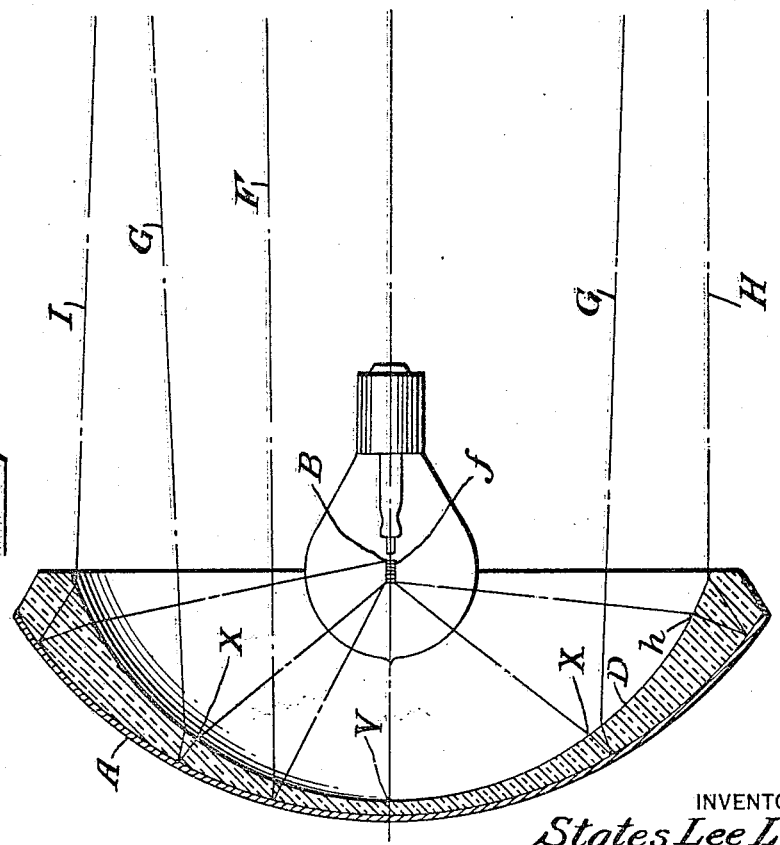
INVENTOR
*States Lee Lebby.*
BY
ATTORNEY Patented Dec. 24, 1929

1,740,609

UNITED STATES PATENT OFFICE

STATES LEE LEBBY, OF CORNING, NEW YORK, ASSIGNOR TO CORNING GLASS WORKS, OF CORNING, NEW YORK, A CORPORATION OF NEW YORK

LIGHT PROJECTOR

Application filed June 11, 1925. Serial No. 36,514.

In the projection of a beam of maximum intensity from a given light source, by the use of reflecting surfaces, the active surface of the reflector should subtend as great a spherical arc of the light source as possible, in order that the light flux therefrom which is refracted and reflected by the mirror shall bear as high a ratio as possible to the total light flux of the source, and the projected beam should be a bundle of approximately parallel rays.

While these two conditions can, to a certain extent, be obtained by using parabolic reflecting surfaces, the manufacturing difficulties which are encountered in their construction have made it desirable to utilize other types of reflectors, prominent among which are spherical mirrors of the so-called Mangin mirror type. Such mirrors are of glass with spherical convex and concave surfaces (the former silvered) so shaped that for a limited area around the vertex thereof spherical aberration is corrected. They can thus reflect and refract, as a substantially parallel bundle of rays, a cone of light falling thereon with an apex angle at the source of about 120°. The formula of their correction, however, is such that, beyond this corrected zone, spherical aberration is present to a great extent and the change from parallel to divergent projection is abrupt, so that a very small extension of such a mirror produces a high divergence. These divergent rays will surround the central parallel beam but, due to the small area by which they are projected, the resulting light intensity is very low, and hence such divergent beams are of negligible intensity in considering the spread of the main beam, and are even objectionable for some purposes. Hence the effective angle of the light source subtended by a Mangin mirror is limited to about 120°.

Such spherical mirrors of deep construction as have heretofore been proposed and used have always had a relatively high spherical aberration which, although not objectionable for some purposes, renders the use of such mirrors prohibitive where high concentration and maximum intensity are desired.

According to my improved construction I have developed a deep spherical mirror of such curvatures that it will have only a slight spherical aberration, and will produce a beam of high concentration and maximum intensity. This limited spherical aberration is also desirable in producing a uniform distribution of the light rays in the beam.

In railway signalling, and in most projectors, it is desirable that a given field of view be covered by the projected beam. In practice, this field subtends between 3° and 8° at the signals, hence a main beam of this spread is desirable. (In special cases secondary beams may be desirable for close-up indications or at curves, but these are not considered here). In order to concentrate the maximum amount of light within this limited beam angle, it is desirable that the reflector have as large an angle of acceptance as possible (i. e. it should be capable of accepting a large solid angle of the rays emanating from the light source, and projecting these rays into the path of the bundle of parallel rays); its aberration should be such that the most divergent and most convergent rays from any point in the light source are projected at such an angle with each other that, when this angle is added to the spread due to the dimensions of the light source, it will give the desired total beam spread; and the change in direction of projection of the rays by successive points of the reflector should be so gradual that the beam as a whole is of substantially uniform intensity.

These desirable results I propose to accomplish by using a catadioptric element having a convex face and a refracting concave face, both spherical and struck from different centers, the thickness of the mirror at its vertex and the distance between the centers of curvature thereof being such that the most desirable results are obtained with a light source located at the point of least confusion. By point of least confusion, I mean the point at which the light source is located when the beam of maximum concentration is obtained.

Referring now to the accompanying drawings in which corresponding parts are designated by corresponding marks of reference:—

Figure 1 is a section through a mirror embodying the invention, and

Fig. 2 shows a mirror and properly located light source.

As a quantitative example of a mirror embodying my invention, I state that the glass of which the mirror shown in Figure 1 is composed has a refractive index of 1.52; that the silvered rear convex face A has a radius R of curvature of 89 mm. struck from the point C on the principal axis; that the spherical front face D is struck with a radius $r$ of curvature of 67.5 mm. from the point E, which is located on the principal axis at a distance $a$ 18.5 mm. from C: that the thickness $t$ of the mirror at the vertex V is 3 mm.; that the point of least confusion is at $f$ giving a divergence of about 1.0° to the ray from such point projected with a maximum divergence by the mirror (see $c$—$d$), and that with a light source having a length of 1.7 mm. along the axis located symmetrically in respect to the focal point, the beam spread is 4°, and that the mirror as a whole subtends an angle at the light source of 180°.

Referring to Figure 2, the light source B is shown as a filament located symmetrically of the principal axis in one plane about the point $f$.

With the construction shown, rays from the end of the filament nearest the vertex of the mirror, falling on the mirror within a certain restricted zone around the vertex (marked by X—X), increase in divergence as the point of their projection is removed from the vertex, as shown by the rays F and G. Rays from the same point of the light source falling on parts of the mirror exterior to such zone are projected at angles progressively less divergent so that, in my preferred construction, the marginal portions of the mirror project light from such point of the light source in rays substantially parallel with the principal axis, as shown at H.

From the above it follows that rays from points in the light source, other than this point, are projected by the margin of the mirror convergent with the principal axis. The maximum angle of convergence of the last named rays (see ray I), due to the position of the light, is the same as the angle of divergence of the rays G having the greatest divergence, so that the first named ray, in crossing the principal optical axis of the mirror within the limits of working distance, will not produce a halo around the principal axis and the principal beam on the opposite side of the axis from that on which the point of the mirror from which it was projected was located. This is illustrated by noting that the ray I is substantially parallel with the ray G illustrated in lower portion of Figure 2 emanating from the opposite side of the mirror.

It will be further noted that, in the case given, the mirror subtends an angle at the light source of 180°. The angle of acceptance (i. e., the angle between the extreme rays on opposite sides of the axis which fall on the mirror, and are projected forwardly thereby) is somewhat less, being, in the case given, double the angle subtended at the light source by the arc V—$h$, or 164°. It is possible, however, to extend the mirror beyond the limits shown in Figure 2, so as to have an acceptance angle up to 176° for a 2° aberration, and even greater extension for larger aberrations, reaching over 200° for a 6° aberration.

If the value of $r$ (the radius of curvature of the concave face) be considered as 1, it will be noted that in the above example the value of R (the radius of curvature of the convex face) is 1.32; the value of $t$ (thickness) is .044, and the value of $a$ (distance between centers) is .274. The acceptance angle is 164°, and the aberration about 2°.

I have found that, generally speaking, with a glass of the usual index of refraction (i. e., 1.52) good results (i. e., an aberration of 6° or less) will be obtained with mirrors, when $\frac{a}{r}$ lies between the limits given by the equation:

$$\frac{a}{r} = .23\left[1.3 - \frac{t}{r} \pm (.11 + 1.3 \cos^3 \phi)\right]$$

where $\phi$ is the angle between the radius to the outer edge of the inner face and the axis of the mirror (see Fig. 1). For a given value of $\phi$ the aberration decreases as $\frac{a}{r}$ increases from the lower to the upper limit given by the equation. For instance, for a mirror with a $\phi$ angle of 65°, and a value of $\frac{a}{r}$ of $$\left[.325 - .23\frac{t}{r}\right],$$

the aberration is about 1°, and with smaller values of $\phi$ the aberration can be decreased still further.

If the value of $a$ is increased beyond the upper limit given in the equation, and the source of light is placed at the point of least confusion, the main beam will be found to be surrounded by a halo. In this case the rays forming the outer edge of the main beam consist partly of rays which converge from a region of the mirror which is inside the marginal region and partly of rays which diverge from an inner region as before, the halo being formed by rays which diverge from the marginal region. The effective acceptance angle in this case is the largest angle between rays which after reflection go to the edge of the main beam. The rays which are outside this acceptance angle form the halo and do not contribute to the intensity of the main beam. This type of mirror is therefore less efficient than a mirror of the same size designed so as not to give halo, though it may form a relatively bright and concentrated beam.

By my invention, therefore, I am enabled to construct a mirror having an acceptance angle of over 135° against about 120° found in Mangin mirrors, and in which the aberration is under 6°, and in which the change in direction of the projected rays is gradual instead of abrupt, within the working limits (i. e. from diverging through parallelism to convergence).

Having thus described the invention what I claim as new, and desire to secure by Letters Patent is:—

1. A catadioptric mirror having an acceptance angle of over 135° formed with spherical surfaces having an inner surface of radius $r$, a vertex thickness $t$ and a distance $a$ between centers, subtending an angle $2\phi$ at the center of inner curvature, and such that $\dfrac{a}{r}$ lies between the limits given by the equation:—

$$\frac{a}{r} = .23 \left[ 1.3 - \frac{t}{r} \pm (.11 + 1.3 \cos^3 \phi) \right]$$

2. A catadioptric mirror having an acceptance angle of over 135° and having spherical front and rear surfaces, the inner face subtending an angle $2\phi$ at its inner center of curvature, in which $a$ lies between the limits given by the equation:—

$$a = .23 \left[ 1.3 - t \pm (.11 + 1.3 \cos^3 \phi) \right]$$

where $a$ is the distance between the center of curvature of the two faces, and in which $t$, the thickness of the mirror at the vertex, varies between zero and .2, the radius of the inner face being taken as unity.

In testimony whereof I hereunto affix my signature.

STATES LEE LEBBY.